United States Patent
Teng et al.

(10) Patent No.: US 8,532,331 B2
(45) Date of Patent: Sep. 10, 2013

(54) METHOD FOR MONITORING A PICTURE OR MULTIMEDIA VIDEO PICTURES IN A COMMUNICATION SYSTEM

(75) Inventors: Zhimeng Teng, Shenzhen (CN); Yinxing Wei, Shenzhen (CN); Xien Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 379 days.

(21) Appl. No.: 13/055,140

(22) PCT Filed: Dec. 16, 2008

(86) PCT No.: PCT/CN2008/073528
§ 371 (c)(1),
(2), (4) Date: Jan. 21, 2011

(87) PCT Pub. No.: WO2010/020101
PCT Pub. Date: Feb. 25, 2010

(65) Prior Publication Data
US 2011/0123064 A1    May 26, 2011

(30) Foreign Application Priority Data
Aug. 22, 2008 (CN) .......................... 2008 1 0214016

(51) Int. Cl.
*G06K 9/00* (2006.01)
(52) U.S. Cl.
USPC .......................................................... 382/100
(58) Field of Classification Search
USPC ........................... 382/100; 705/51; 713/189
See application file for complete search history.

(56) References Cited

U.S. PATENT DOCUMENTS

| | | | |
|---|---|---|---|
| 6,728,398 B1 * | 4/2004 | Hondl | 382/162 |
| 2003/0184659 A1 * | 10/2003 | Skow | 348/223.1 |
| 2006/0026150 A1 | 2/2006 | Hamada | |
| 2007/0300249 A1 * | 12/2007 | Smith et al. | 725/19 |
| 2008/0141033 A1 * | 6/2008 | Ginter et al. | 713/175 |

FOREIGN PATENT DOCUMENTS

| | | | |
|---|---|---|---|
| CN | 1599372 A | | 3/2005 |
| CN | 1713569 A | | 12/2005 |
| CN | 101018129 A | | 8/2007 |
| JP | 2007-233554 | * | 9/2007 |
| JP | 2007233554 A | | 9/2007 |

OTHER PUBLICATIONS

Impress Watch Oct. 30, 2007.
Great Firewall Feb. 2007.

(Continued)

*Primary Examiner* — Amara Abdi
(74) *Attorney, Agent, or Firm* — Oppedahl Patent Law Firm LLC

(57) ABSTRACT

A method for monitoring a picture or multimedia video pictures in a communication system is provided. The method includes following steps: a monitoring node extracts a picture or multimedia video pictures from communication data; a preprocessing system divides the picture or multimedia video pictures into multiple parts, and executes hash calculation respectively to obtain hash value of each part; the preprocessing system processes multiple hash values to construct a single ID; a primary monitoring system searches a template base for the ID, the template base includes multiple items, and each item includes an ID and hash values of which the ID in the item is composed; if the ID is not found, the primary monitoring system searches the template base for each hash value respectively; and the primary monitoring system informs the search result to the preprocessing system and the monitoring node. The present invention improves the efficiency of monitoring a picture or multimedia video pictures in communications.

49 Claims, 9 Drawing Sheets

(56) References Cited

OTHER PUBLICATIONS

International Search Report in international application No. PCT/CN2008/073528, mailed on Apr. 2, 2011.

English Translation of the Written Opinion of the International Search Authority in international application No. PCT/CN20081073528, mailed on Apr. 2, 2011.

* cited by examiner

METHOD FOR MONITORING A PICTURE OR MULTIMEDIA VIDEO PICTURES IN A COMMUNICATION SYSTEM

TECHNICAL FIELD

The present invention relates to the field of communications, specifically to a method for monitoring a picture or multimedia video pictures in a communication system.

BACKGROUND

In network communications, there is a phenomenon that harmful information is transmitted via a picture and multimedia video pictures. Therefore it is hoped to recognize this picture and multimedia video pictures. Here, the multimedia video pictures refer to a set of all pictures during a video display, which is a group of successive pictures. In order to recognize whether a picture or multimedia video pictures contain the harmful information, firstly the content of the picture and the multimedia video pictures need to be represented, then the picture and the multimedia video pictures are recognized by using a matching method, and at last, a corresponding monitoring measure is adopted according to the recognition result.

Currently, there are various feature-based picture representation methods using hash algorithm, and the hash algorithm here is also called hash function (or called hashing function, it has no influence on the essence of the present invention). The hash function is a function which is used to map an input message string of an arbitrary length into an output message string of a fixed length. The output message string is called hash value of the message, which is also called hashing value. The change of a single bit in any input message string will lead to a change of about half of the bits in the output message string. The hash function should at least meet the following conditions: 1) the length of the input message string is arbitrary; 2) the length of the output message string is fixed; 3) it is relatively easy to calculate the hash value of each given input message string; 4) if the description of the hash function is given, and two different input message strings mapped to one hash value are found, then the hash value cannot be calculated. Thus, the hash value can be used to represent a picture uniquely.

The current picture representation methods are mainly classified into two types. One type of method comprises the following steps: firstly a whole picture is represented by adopting the hash algorithm, and then recognized. The other type of method comprises the following steps: firstly a picture is divided in a certain manner, then the hash value of each divided part is calculated to obtain a group of hash values for representing the picture, and at last, the picture is recognized through each hash value; and this method can recognize a picture of which the content is modified.

For the two types of method, the first type of method can only be used to recognize an identical picture, but can not be used to recognize a modified picture; while the second type of method can recognize a content-modified picture, however, it is required to carry out a matching on each hash value during recognizing a picture. Therefore the shortcomings of the two types of picture representation method can both lead to inefficient picture recognition, so that the two types of picture representation method cannot be applied to a monitoring system conveniently. Particularly, if the two types of method are combined together, i.e. firstly using the first type of method and then the second type of method, then there are still some shortcomings in efficiency (i.e. the is efficiency is low) because hash calculation should be executed once for the picture and binary bytes for representing the initial picture are too many. Such shortcomings also exist with respect to the multimedia video pictures.

SUMMARY

In order to solve the problem of low efficiency of monitoring a picture or multimedia video pictures in the prior art, the present invention aims to provide a method for monitoring a picture or multimedia video pictures in a communication system.

In order to realize the purpose of the present invention, a method for monitoring a picture or multimedia video pictures in a communication system is provided according to the present invention.

A method for monitoring a picture or multimedia video pictures in a communication system according to the present invention includes the following steps: a monitoring node extracts a picture or multimedia video pictures from communication data; a preprocessing system divides the picture or multimedia video pictures into multiple parts, and executes hash calculation of each part respectively to obtain a hash value of each part; the preprocessing system processes the multiple hash values to construct a single ID; a primary monitoring system searches a template base for the ID, wherein the template base includes multiple items, and each item includes an ID and hash values of which the ID in the item is composed; the primary monitoring system searches the template base for each hash value respectively if the ID is not found; and the primary monitoring system informs the search result to the preprocessing system and the monitoring node.

Further, in the present invention, the method also has the following characteristics: the process that the primary monitoring system informs the search result to the preprocessing system and the monitoring node specifically includes: the primary monitoring system informs the search result to the preprocessing system, which then informs the search result to the monitoring node; or the primary monitoring system simultaneously informs the search result to the preprocessing system and the monitoring node.

Further, in the present invention, the method also has the following characteristics: the items of the template base is prestored with the ID of forwarding-forbidden picture or multimedia video pictures and the hash values of which the ID in the items are composed; the monitoring method further includes: if the search result is that the ID is found, then the primary monitoring system or the preprocessing system forwards relevant information of the picture or multimedia video pictures to a deep monitoring system; the monitoring node cancels the forwarding of the picture or multimedia video pictures; and the preprocessing system forwards the picture or multimedia video pictures to the deep monitoring system.

Further, in the present invention, the method also has the following characteristics: if the search result is that the hash value, instead of the ID, is found, then the primary monitoring system or the preprocessing system forwards the relevant information of the picture or multimedia video pictures to the deep monitoring system; the primary monitoring system adds the ID into the template base; the preprocessing system forwards the picture or multimedia video pictures to the deep monitoring system; and the monitoring node cancels the forwarding of the picture or multimedia video pictures.

Further, in the present invention, the method also has the following characteristics: if the search result is that neither the ID nor the hash value is found, then the monitoring node forwards the picture or multimedia video pictures.

Further, in the present invention, the method also has the following characteristics: each item further includes attribute of the ID, and the process that the primary monitoring system searches the template base for the ID specifically includes: if the ID is found, then the attribute of the ID is read.

Further, in the present invention, the method also has the following characteristics: if the search result is that the ID is found and the attribute of the ID is forwarding-forbidden, then the primary monitoring system or the preprocessing system forwards the relevant information of the picture or multimedia video pictures to the deep monitoring system; the monitoring node cancels the forwarding of the picture or multimedia video pictures; and the preprocessing system forwards the picture or multimedia video pictures to the deep monitoring system.

Further, in the present invention, the method also has the following characteristics: if the search result is that the ID is found and the attribute of the ID is forwarding-allowed, then the monitoring node forwards the picture or multimedia video pictures.

Further, in the present invention, the method also has the following characteristics: if the ID is not found, then the process that the primary monitoring system searches the template base for each hash value respectively specifically includes: the primary monitoring system searches for each hash value according to the hash value of the ID whose attribute is forwarding-forbidden in the template base.

Further, in the present invention, the method also has the following characteristics: if the search result is that the hash value, instead of the ID, is found, then the primary monitoring system or the preprocessing system forwards the relevant information of the picture or multimedia video pictures to the deep monitoring system; the primary monitoring system adds the ID into the template base; the preprocessing system forwards the picture or multimedia video pictures to the deep monitoring system; and the monitoring node cancels the forwarding of the picture or multimedia video pictures.

Further, in the present invention, the method also has the following characteristics: if the search result is that neither the ID nor the hash value is found, then the primary monitoring system or the preprocessing system forwards the relevant information of the picture or multimedia video pictures to the deep monitoring system; the preprocessing system forwards the picture or multimedia video pictures to the deep monitoring system; and the primary monitoring system receives a notification from the deep monitoring system and accordingly informs the monitoring node.

Further, in the present invention, the method also has the following characteristics: the process that the notification indicates the picture or multimedia video pictures to be forwarding-forbidden further includes: the primary monitoring system adds the ID into the template base, sets the attribute of the ID to be forwarding-forbidden, adds the multiple hash values into the item corresponding to the ID, and informs a forwarding-forbidden indication to the monitoring node; and the monitoring node cancels the forwarding of the picture or multimedia video pictures.

Further, in the present invention, the method also has the following characteristics: the process that the notification indicates the picture or multimedia video pictures to be forwarding-allowed further includes: the primary monitoring system adds the ID and the multiple hash values into the template base and sets the attribute of the ID to be forwarding-allowed; the primary monitoring system informs a forwarding-allowed indication to the monitoring node; and the monitoring node forwards the picture or multimedia video pictures.

Further, in the present invention, the method also has the following characteristics: if the monitoring node does not receive the notification within a given time, then the monitoring node forwards the picture or multimedia video pictures, or cancels the forwarding of the picture or multimedia video pictures.

Further, in the present invention, the method also has the following characteristics: if the search result is that neither the ID nor the hash value is found, then the monitoring node forwards the picture or multimedia video pictures.

Further, in the present invention, the method also has the following characteristics: the relevant information includes at least one of: a sender ID, a receiver ID, a service ID, information block size, information sending time, picture format and picture size of the picture or multimedia video pictures.

Further, in the present invention, the method also has the following characteristics: the process that the picture is divided into multiple parts and each part is executed the hash calculation respectively to obtain the hash value of each part specifically includes: the preprocessing system divides the picture into N*M parts, wherein N and M are both positive integers; and the preprocessing system executes the hash calculation respectively for the N*M parts to obtain N*M hash values.

Further, in the present invention, the method also has the following characteristics: the process that the multiple hash values are processed to construct the single ID specifically includes: the preprocessing system executes the hash calculation for the multiple hash values to obtain a single characteristic hash value as the ID.

Further, in the present invention, the method also has the following characteristics: the process that the multiple hash values are executed the hash calculation to obtain the single characteristic hash value specifically includes: the preprocessing system connects the multiple hash values into a single character string; and the preprocessing system executes the hash calculation for the character string to obtain a single character string of less bits as the characteristic hash value.

Further, in the present invention, the method also has the following characteristics: the process that the multiple hash values are processed to construct the single ID specifically includes: the preprocessing system connects the multiple hash values into a single character string as the ID.

Further, in the present invention, the method also has the following characteristics: the picture is executed format processing and/or size processing to obtain a processed picture; and the processed picture is divided into multiple parts and each part is executed the hash calculation respectively, and the multiple hash values are processed to construct the single ID.

Further, in the present invention, the method also has the following characteristics: the picture is executed color processing to obtain a color-processed picture; and the color-processed picture is divided into multiple parts and each part is executed the hash calculation respectively, and the multiple hash values are processed to construct the single ID.

Further, in the present invention, the method also has the following characteristics: the picture is executed characteristic value extraction for I times to obtain I extracted sub-pictures and 1 sub-picture as the part of the picture left after the extraction; and then, the I+1 sub-pictures are divided into multiple parts and each part is executed the hash calculation respectively, and the multiple hash values are processed to construct the single ID.

Further, in the present invention, the method also has the following characteristics: the process that the multimedia video pictures are divided into multiple parts and each part is executed the hash calculation respectively to obtain the hash value of each part specifically includes: the preprocessing system divides the multimedia video pictures into N parts, wherein N is a positive integer; all picture data of each part of the N parts are serially connected in a given manner respectively to form N data parts; and the preprocessing system executes the hash calculation respectively for the N parts to obtain N hash values.

Further, in the present invention, the method also has the following characteristics: the process that the multiple hash values are processed to construct the single ID specifically includes: the preprocessing system executes the hash calculation for the multiple hash values to obtain a single characteristic hash value as the ID.

Further, in the present invention, the method also has the following characteristics: the process that the multiple hash values are executed the hash calculation to obtain the single characteristic hash value specifically includes: the preprocessing system connects the multiple hash values into a single character string; and the preprocessing system executes the hash calculation for the character string to obtain a single character string of less bits as the characteristic hash value.

Further, in the present invention, the method also has the following characteristics: the process that the multiple hash values are processed to construct the single ID specifically includes: the preprocessing system connects the multiple hash values into a single character string as the ID.

Further, in the present invention, the method also has the following characteristics: the multimedia video pictures are executed format processing and/or size processing to obtain processed multimedia video pictures; and the processed multimedia video pictures are divided into multiple parts and each part is executed the hash calculation respectively, and the multiple hash values are processed to construct the single ID.

Further, in the present invention, the method also has the following characteristics: the multimedia video pictures are executed color processing to obtain color-processed multimedia video pictures; and the color-processed multimedia video pictures are divided into multiple parts and each part is executed the hash calculation respectively, and the multiple hash values are processed to construct the single ID.

Further, in the present invention, the method also has the following characteristics: the multimedia video pictures are executed characteristic value extraction for I times to obtain I multimedia video sub-pictures and 1 sub-picture as the part of the initial pictures left after the extraction; and then, the I+1 multimedia video sub-pictures are divided into multiple parts and each part is executed the hash calculation respectively, and the multiple hash values are processed to construct the single ID.

Further, in the present invention, the method also has the following characteristics: a known forwarding-forbidden picture or multimedia video pictures are divided into multiple parts in advance and each part is executed the hash calculation respectively to obtain the hash value of each part; the multiple hash values are processed to obtain the ID; and the ID and the multiple hash values are added into the template base.

Further, in the present invention, the method also has the following characteristics: a known forwarding-allowed or forwarding-forbidden picture or multimedia video pictures are divided into multiple parts and each part is executed the hash calculation respectively to obtain the hash value of each part; the multiple hash values are processed to obtain the ID; and the ID and the multiple hash values are added into the item in the template base, and the attribute of the ID is set to be forwarding-allowed or forwarding-forbidden correspondingly.

By means of at least one of the above-mentioned technical solutions, the present invention processes multiple hash values into a single ID and only monitors the ID at first by using the method for monitoring a picture or multimedia video pictures in a communication system, so that the problem of low efficiency of monitoring a picture or multimedia video pictures in the prior art is solved, and the efficiency of monitoring a picture or multimedia video pictures in communications is improved.

BRIEF DESCRIPTION OF THE DRAWINGS

The drawings described herein are intended to provide further understanding of the present invention and constitute a part of the application. The exemplary embodiments of the present invention and their descriptions are used to explain the present invention and don't constitute any improper limitation to the present invention, in the drawings.

DETAILED DESCRIPTION

Functional Overview

Considering the problem of low efficiency of monitoring a picture or multimedia video pictures in the prior art, an embodiment of the present invention provides a scheme for monitoring a picture or multimedia video pictures in a communication system. In the scheme, a monitoring node extracts a picture or multimedia video pictures from communication data; a preprocessing system divides the picture or multimedia video pictures into multiple parts, and executes hash calculation of each part respectively to obtain a hash value of each part; the preprocessing system processes multiple hash values to construct a single ID; a primary monitoring system searches a template base for the ID, the template base includes multiple items, and each item includes an ID and hash values of which the ID in the item is composed; if the ID is not found, then the primary monitoring system searches the template base for each hash value respectively; and the primary monitoring system informs the search result to the preprocessing system and the monitoring node.

It should be noted that the embodiments and the characteristics in the embodiments of the application can be combined with each other when there is no conflict. The present invention will be described in details hereinafter with reference to the drawings and embodiments.

Figure 1:
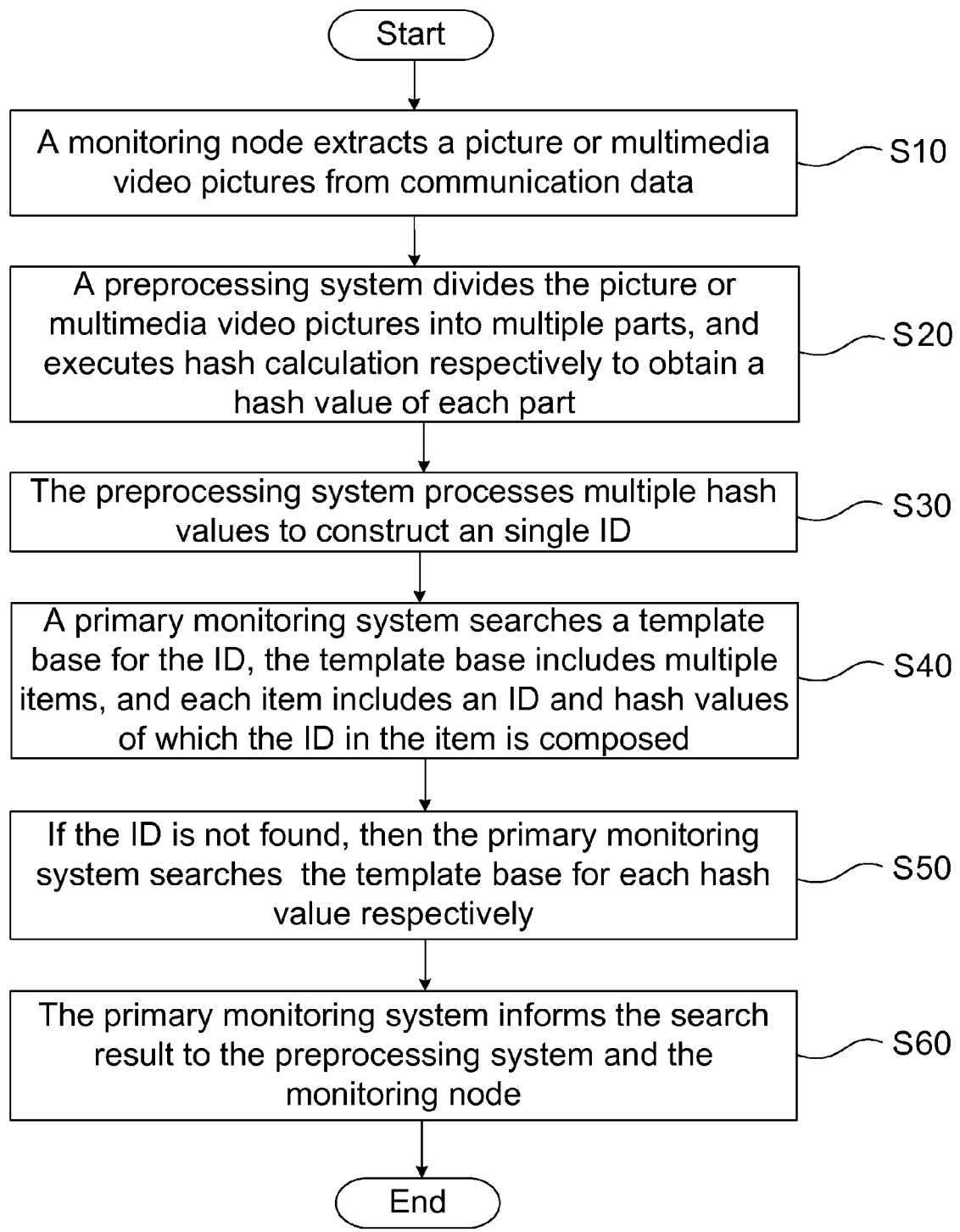
FIG. 1 is a flow chart of a method for monitoring a picture or multimedia video pictures in a communication system according to an embodiment of the present invention.

FIG. 1 is a flow chart of a method for monitoring a picture or multimedia video pictures in a communication system according to an embodiment of the present invention, which includes the following steps S10-S60.

Step S10: a monitoring node extracts a picture or multimedia video pictures from communication data.

Step S20: a preprocessing system divides the picture or multimedia video pictures into multiple parts, and executes hash calculation of each part respectively to obtain a hash value of each part.

Step S30: the preprocessing system processes multiple hash values to construct a single ID.

Step S40: a primary monitoring system searches a template base for the ID, wherein the template base includes multiple items, and each item includes an ID and hash values of which the ID in the item is composed.

Step S50: if the ID is not found, then the primary monitoring system searches the template base for each hash value respectively.

Step S60: the primary monitoring system informs the search result to the preprocessing system and the monitoring node.

According to the monitoring method of the embodiment, the multiple hash values are processed into the single ID and the ID is monitored, therefore the problem of low efficiency of monitoring a picture or multimedia video pictures in the prior art is solved, and the efficiency of monitoring a picture or multimedia video pictures is improved during communications.

Figure 2:
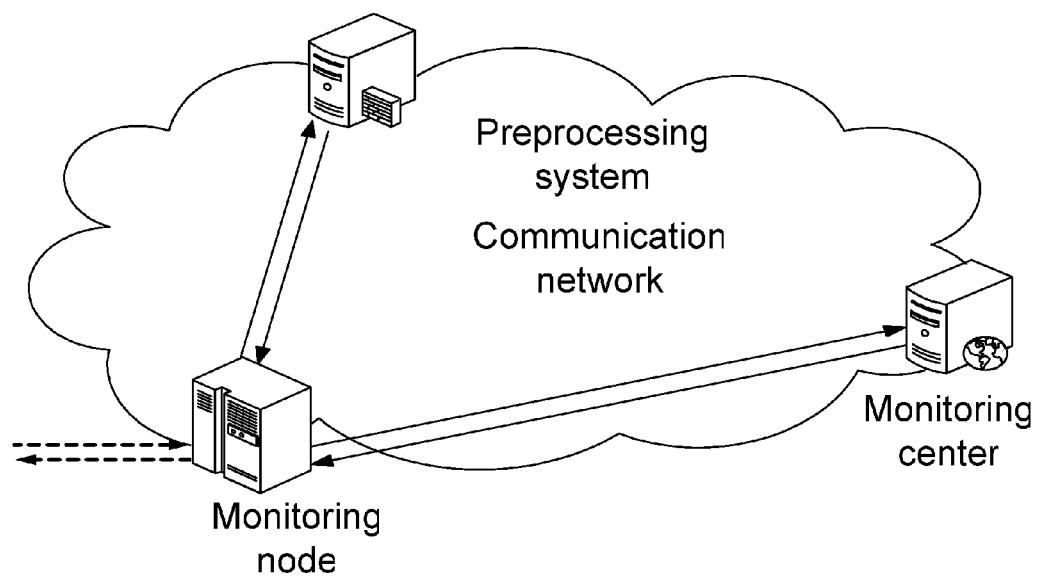
FIG. 2 is a schematic diagram of the implementation of a monitoring system in a communication network according to preferred embodiment 1 of the present invention.

FIG. 2 is a schematic diagram of the implementation of a monitoring system in a communication network according to preferred embodiment 1 of the present invention, and a monitoring center in FIG. 2 corresponds to the primary monitoring system in the embodiment. As shown in FIG. 2, a monitoring node in charge of extracting information to be monitored and a monitoring center in charge of monitoring the content of the information are configured in a communication network. The monitoring node may be an access gateway, a border gateway, a content filter device, a deep mining device and other network devices in a packet network; and the monitoring node may be a multimedia service center (MMSC for short), a short message gateway and other devices in a multimedia messaging service. In order to recognize the monitored information content, a preprocessing system is also configured in the communication network, which is a logic function unit; and the preprocessing system may be located at a monitoring node or exist as an independent physical entity in the specific realization.

Figure 3:
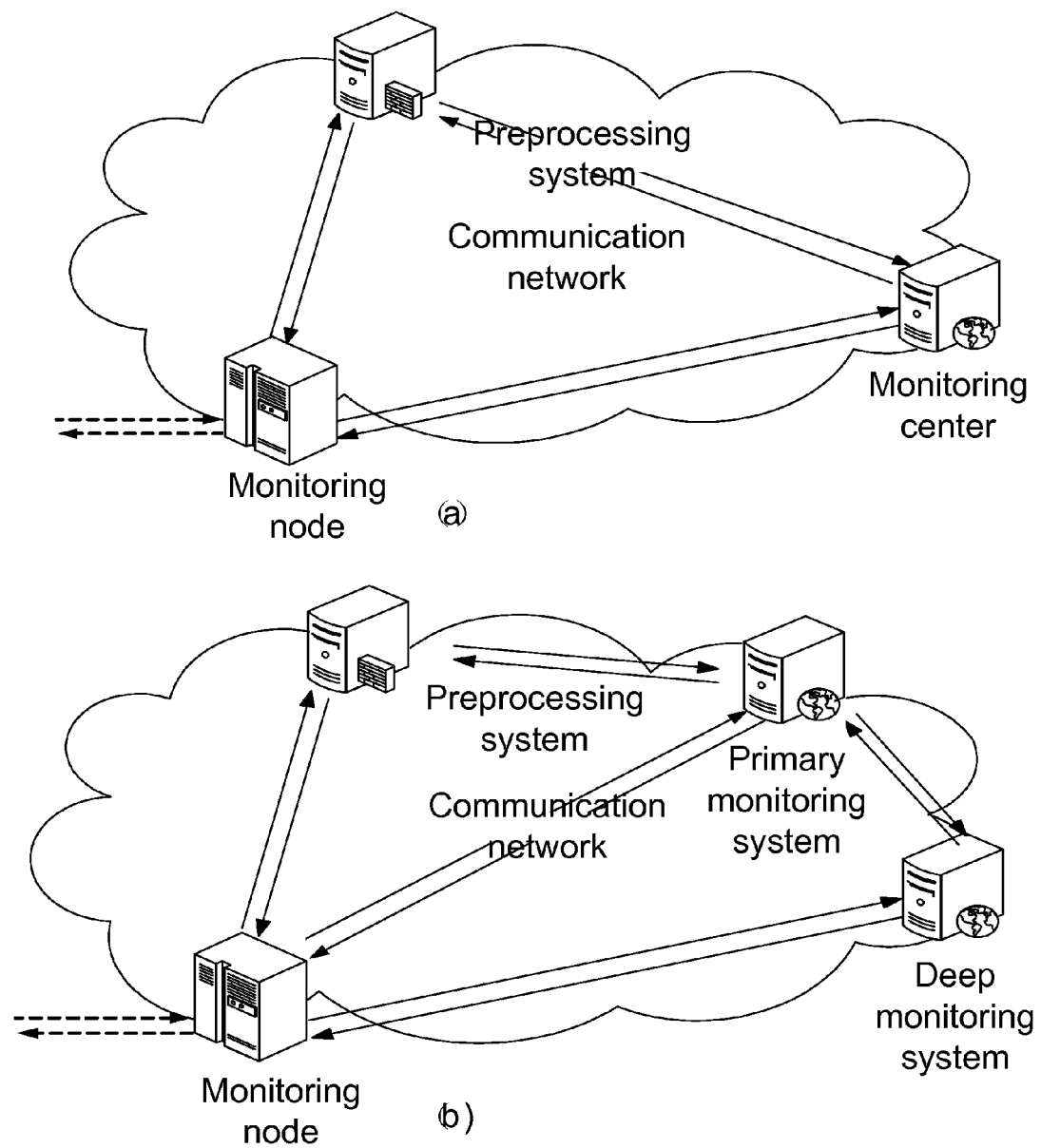
FIG. 3 is a schematic diagram of the implementation of a monitoring system in a communication network according to preferred embodiment 2 of the present invention.

FIG. 3 is a schematic diagram of the implementation of a monitoring system in a communication network according to preferred embodiment 2 of the present invention. As shown in FIG. 3, a one-level monitoring system in diagram a only includes a monitoring center which is used as a primary monitoring system, while a two-level monitoring system in diagram b includes a primary monitoring system and a deep monitoring system which undertakes more manual recognition operations.

According to requirements of a security strategy rule, a preprocessing system sends a calculated ID and hash value string for representing a picture and multimedia video pictures and relevant information thereof to the monitoring center. The relevant information may include a sender ID (e.g. a name, a cell phone number and an IP address), a receiver ID (e.g. a name, a cell phone number and an IP address), a service ID (e.g. a multimedia message ID, a port number and a stream class), information block size (e.g. a byte number), information sending time, picture format, picture size and the like.

According to the requirements of the security strategy rule, the monitoring center, analyzes user behavior by using the received ID, the hash value string and a preconfigured template base.

Wherein, step S60 specifically includes: the primary monitoring system informs the search result to the preprocessing system, and the preprocessing system informs the search result to the monitoring node; or the primary monitoring system simultaneously informs the search result to the preprocessing system and the monitoring node.

The template base is prestored with the ID of forwarding-forbidden picture or multimedia video pictures, if the search result is that the ID is found, then the primary monitoring system or the preprocessing system forwards the relevant information of the picture or multimedia video pictures to the deep monitoring system; the monitoring node cancels the forwarding of the picture or multimedia video pictures; and the preprocessing system forwards the picture or multimedia video pictures to the deep monitoring system. In this preferred scheme, once the ID is found, it can be confirmed that the picture or multimedia video pictures corresponding to the ID are forwarding-forbidden, thus the processing speed of monitoring is accelerated.

Moreover, the processing of the search result may include the following situations.

(1) If the search result is that the hash value, instead of the ID, is found, then the primary monitoring system or the preprocessing system forwards the relevant information of the picture or multimedia video pictures to the deep monitoring system; the primary monitoring system adds the ID into the template base; the preprocessing system forwards the picture or multimedia video pictures to the deep monitoring system; and the monitoring node cancels the forwarding of the picture or multimedia video pictures. If the hash value is found, then it is indicated that the picture or multimedia video pictures may be modified forwarding-forbidden pictures, and in this preferred embodiment, corresponding processing is executed for this case.

(2) If the search result is that neither the ID nor the hash value is found, then the monitoring node forwards the picture or multimedia video pictures; and if neither the ID nor the hash value is found, then the picture or multimedia video pictures can be determined as unharmful information which can be forwarded.

(3) In the case that each item further includes the attribute of the ID, the process that the primary monitoring system searches the template base for the ID specifically includes: if the ID is found, then the attribute of the ID is read. In this preferred embodiment, an attribute field is added into the template base to specifically define whether the picture or multimedia video pictures are unharmful information and whether the picture or multimedia video pictures should be forwarded.

(4) If the search result is that the ID is found and the attribute of the ID is forwarding-forbidden, then the primary monitoring system or the preprocessing system forwards the relevant information of the picture or multimedia video pictures to a deep monitoring system; the monitoring node cancels the forwarding of the picture or multimedia video pictures; and the preprocessing system forwards the picture or multimedia video pictures to the deep monitoring system. In this preferred embodiment, as the attribute is set to be forwarding-forbidden, the forwarding of the picture or multimedia video pictures is directly cancelled.

(5) If the search result is that the ID is found and the attribute of the ID is forwarding-allowed, then the monitoring node forwards the picture or multimedia video pictures. In this preferred embodiment, as the attribute is set to be forwarding-allowed, the forwarding of the picture or multimedia video pictures is directly allowed.

(6) If the ID is not found, then the process that the primary monitoring system searches the template base for each hash value respectively specifically includes: in view of the situation that the picture or multimedia video pictures may be modified forwarding-forbidden picture or multimedia video pictures, the primary monitoring system searches for each hash value according to the hash value of the ID whose attribute is forwarding-forbidden in the template base.

(7) If the search result is that the hash value, instead of the ID, is found, then the primary monitoring system or the preprocessing system forwards the relevant information of the picture or multimedia video pictures to the deep monitoring system; the primary monitoring system adds the ID into the template base; the preprocessing system forwards the picture or multimedia video pictures to the deep monitoring system; and the monitoring node cancels the forwarding of the picture or multimedia video pictures. If the hash value is found, then it is confirmed that the picture or multimedia video pictures are modified, and then corresponding processing can be executed.

(8) If the search result is that neither the ID nor the hash value is found, then the primary monitoring system or the preprocessing system forwards the relevant information of the picture or multimedia video pictures to the deep monitoring system; the preprocessing system forwards the picture or multimedia video pictures to the deep monitoring system; and the primary monitoring system receives a notification from the deep monitoring system and accordingly informs the monitoring node. If neither the ID nor the hash value is found, then it is indicated that the picture or multimedia video pictures are new ones that had never entered the monitoring system; this preferred embodiment executes corresponding processing for this case, for example, the new picture or multimedia video pictures are forwarded to the deep monitoring system to be processed (e.g. manual monitoring by a specific monitoring department).

Wherein the process that the notification indicates the picture or multimedia video pictures to be forwarding-forbidden or forwarding-allowed specifically includes the following steps.

Firstly, the process that the notification indicates the picture or multimedia video pictures to be forwarding-forbidden includes: the primary monitoring system adds the ID into the template base, sets the attribute of the ID to be forwarding-forbidden, adds the multiple hash values into the item corresponding to the ID, and informs a forwarding-forbidden indication to the monitoring node; and the monitoring node cancels the forwarding of the picture or multimedia video pictures. In this embodiment, if the forwarding-forbidden indication is received, the forwarding of the picture or multimedia video pictures is cancelled correspondingly.

Secondly, the process that the notification indicates the picture or multimedia video pictures to be forwarding-allowed includes: the primary monitoring system adds the ID and the multiple hash values into the template base and sets the attribute of the ID to be forwarding-allowed; the primary monitoring system informs a forwarding-allowed indication to the monitoring node; and the monitoring node forwards the picture or multimedia video pictures. In this embodiment, if the forwarding-allowed indication is received, the picture or multimedia video pictures are forwarded correspondingly, and the attribute information is added into the template base.

Additionally, if the monitoring node does not receive the notification within a given time, then the forwarding of the picture or multimedia video pictures is allowed or cancelled. The preferred embodiment provides a processing scheme for timeout case.

(9) If the search result is that neither the ID nor the hash value is found, then the monitoring node forwards the picture or multimedia video pictures. If neither the ID nor the hash value is found, then it is indicated that the picture or multimedia video pictures are new ones that had never entered the monitoring system; this preferred embodiment executes corresponding processing for this case, for example, the new picture or multimedia video pictures are forwarded directly.

The relevant information may include a sender ID (e.g. a name, a cell phone number and an IP address), a receiver ID (e.g. a name, a cell phone number and an IP address), a service ID (e.g. a multimedia message ID, a port number and a stream class), information block size (e.g. a byte number), information sending time, picture format, picture size and the like.

Figure 4:
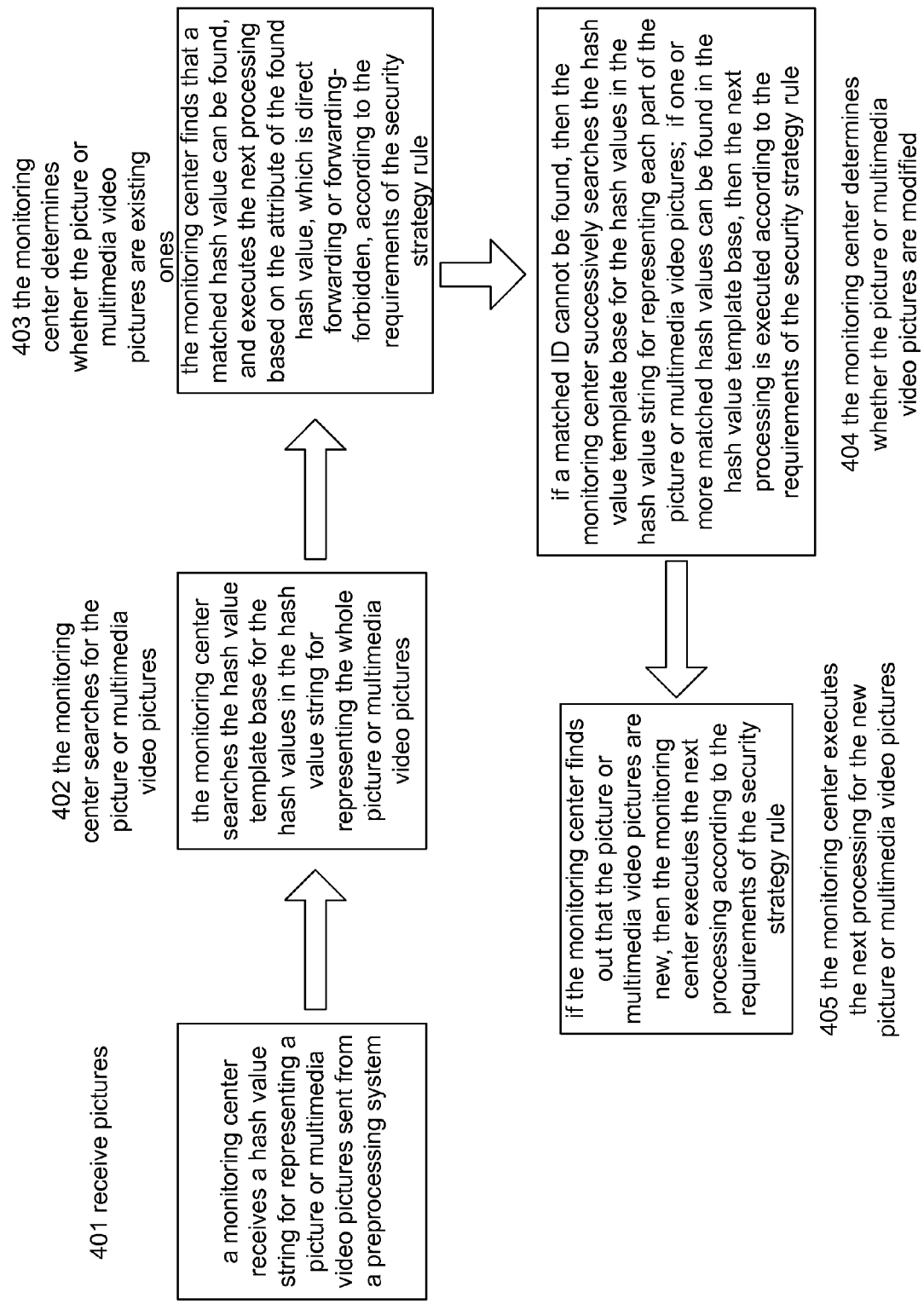
FIG. 4 is a schematic diagram of a method for monitoring a picture or multimedia video pictures according to preferred embodiment 3 of the present invention.

FIG. 4 is a schematic diagram of a method for monitoring a picture or multimedia video pictures according to preferred embodiment 3 of the present invention. As shown in FIG. 4, the monitoring method includes the following steps S401-S405.

Step S401: according to the requirements of the security strategy rule, a monitoring center receives an ID and a hash value string for representing a picture or multimedia video pictures and relevant information thereof sent from a preprocessing system, and analyzes user behavior by using a preconfigured template base. The relevant information may include a sender ID (e.g. a name, a cell phone number and an IP address), a receiver ID (e.g. a name, a cell phone number and an IP address), a service ID (e.g. an IP packet ID, a multimedia message ID), information block size (e.g. a byte number), information sending time, picture format, picture size and the like.

Step S402: according to the requirements of the security strategy rule, the monitoring center searches the template base for the ID for representing the whole picture or multimedia video pictures.

Step S403: the monitoring center finds that a matched ID can be found. According to the requirements of the security strategy rule, if the specific attribute of the found ID is forwarding-allowed, then it is indicated that the picture or multimedia video pictures meet the requirements of the security strategy rule, and the monitoring center feeds the information back to the preprocessing system, which then informs the monitoring node to allow forwarding the message; or the monitoring center directly informs the monitoring node to forward the message and feeds the information back to the preprocessing system. If the attribute of the found ID is forwarding-forbidden, then it is indicated that the picture or multimedia video pictures violate the requirements of the security strategy rule, and the monitoring center feeds the information back to the preprocessing system, which then informs the monitoring node to forbid forwarding the message; or the monitoring center informs the monitoring node to forbid forwarding the message and feeds the information back to the preprocessing system; and the monitoring center may need to inform monitoring personnel of the transmission of the controlled information in the communication network.

Step S404: if a matched ID cannot be found, then the monitoring center searches the template base for the hash values for representing each part of the picture or multimedia video pictures successively. According to the requirements of the security strategy rule, if one or more matched hash values can be found in the template base, then it is indicated that the picture or multimedia video pictures are modified, and the next processing is executed according to the requirements of the security strategy rule. For example, the monitoring center feeds the information back to the preprocessing system, which then reports the picture or multimedia video pictures and the like information to the monitoring center and simultaneously feeds the information back to the monitoring node, and the monitoring node forbids, delays or allows forwarding the picture or multimedia video pictures according to the requirements of the security strategy rule. Herein, when certain one or some hash values are matched, the attribute of the hash values of the picture or multimedia video pictures are set to be forwarding-forbidden immediately according to the requirements of the security strategy rule, so as to indicate that the picture or multimedia video pictures violate the requirements of the security strategy rule; then the monitoring center feeds the information back to the preprocessing system, which then informs the monitoring node to forbid forwarding the message; or the monitoring center informs the monitoring node to forbid forwarding the message and feeds the information back to the preprocessing system; and the monitoring center may need to inform monitoring personnel of the transmission of the controlled information in the communication network.

Step S405: if in the template base, the monitoring center cannot found any matched hash value in a hash value string, then it is indicated that the picture or multimedia video pictures are new ones that had never appeared in the communication network, and the next processing is executed according to the requirements of the security strategy rule. For example, the monitoring center feeds the information back to the preprocessing system, which then reports the picture or multimedia video pictures and the like information to the monitoring center and simultaneously feeds the information back to the monitoring node, and the monitoring node forbids, delays or allows forwarding the picture or multimedia video pictures according to the requirements of the security strategy rule.

Figure 5:
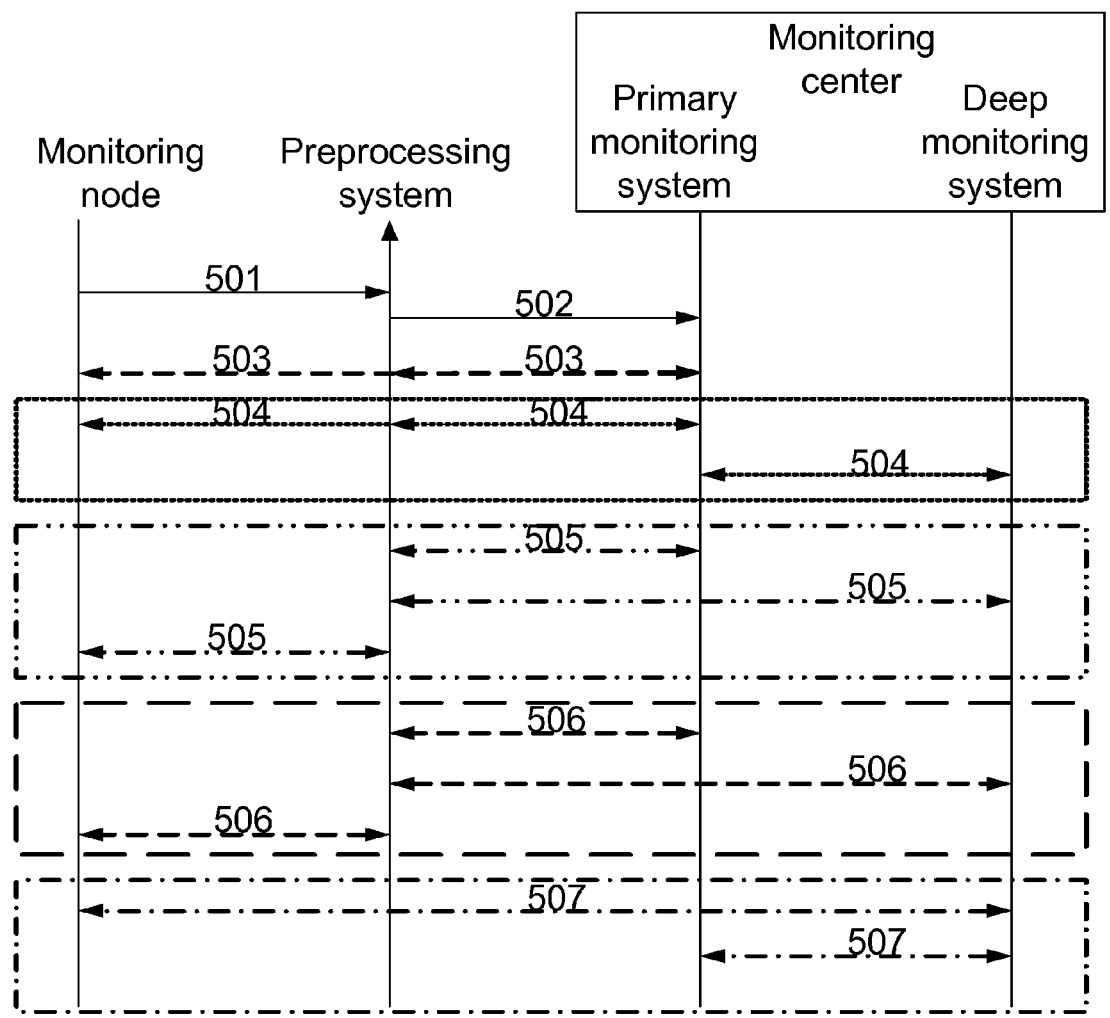
FIG. 5 is a schematic diagram of a method for monitoring a picture or multimedia video pictures according to preferred embodiment 4 of the present invention.

FIG. 5 is a schematic diagram of a method for monitoring a picture or multimedia video pictures according to preferred embodiment 4 of the present invention. As shown in FIG. 5, the monitoring method includes the following steps S501 to S507.

Step S501: according to the requirements of the security strategy rule, a monitoring node sends a picture or multimedia video pictures and relevant information thereof to a preprocessing system. The relevant information may include a sender ID (e.g. a name, a cell phone number and an IP address), a receiver ID (e.g. a name, a cell phone number and an IP address), a service ID (e.g. an IP packet ID, a multimedia message ID), information block size (e.g. a byte number), information sending time, picture format, picture size and the like.

Step S502: according to the requirements of the security strategy rule, the preprocessing system sends a calculated ID and hash value string for representing the picture or multimedia video pictures and relevant information thereof to a monitoring center, or a primary monitoring system if the monitoring center is a two-level monitoring system.

Step S503: according to the requirements of the security strategy rule, the monitoring center (the primary monitoring system) analyzes user behavior by using the received ID, the hash value string and a preconfigured template base. If it is found that the picture or multimedia video pictures are existing ones and the specific attribute of the picture or multimedia video pictures are forwarding-allowed, then it is indicated that the picture or multimedia video pictures meet the requirements of the security strategy rule, and the monitoring center (the primary monitoring system) feeds the information back to the preprocessing system, which then informs the monitoring node to allow forwarding the message; or the monitoring center (the primary monitoring system) directly informs the monitoring node to forward the message and feeds the information back to the preprocessing system.

Step S504: according to the requirements of the security strategy rule, the monitoring center (the primary monitoring system) analyzes user behavior by using the received ID, the hash value string and the preconfigured template base. If it is found that the picture or multimedia video pictures are existing ones and the specific attribute of the picture or multimedia video pictures are forwarding-forbidden, then it is indicated that the picture or multimedia video pictures violate the requirements of the security strategy rule, and the monitoring center (the primary monitoring system) feeds the information back to the preprocessing system, which then informs the monitoring node to forbid forwarding the message; or the monitoring center (the primary monitoring system) informs the monitoring node to forbid forwarding the message and feeds the information back to the preprocessing system. And the monitoring center of the one-level monitoring system may need to inform monitoring personnel of the transmission of the controlled message in the communication network; and the primary monitoring system of the monitoring center of the two-level monitoring system may need to report the information to a deep monitoring system, which may need to inform monitoring personnel of the transmission of the controlled information in the communication network.

Step S505: according to the requirements of the security strategy rule, the monitoring center (the primary monitoring system) analyzes user behavior by using the received ID, the hash value string and the preconfigured template base. If it is found that the picture or multimedia video pictures are modified, then according to the requirements of the security strategy rule, the monitoring center (the primary monitoring system) feeds the information back to the preprocessing system, which may need to report the picture or multimedia video pictures, the relevant information, the ID, the hash value string and the like information to the monitoring center (the deep monitoring system), and the monitoring center (the deep monitoring system) may need to inform monitoring personnel of the transmission of the modified picture or multimedia video pictures in the communication network. And the preprocessing system feeds the information back to the monitoring node, and the monitoring node forbids, delays or allows forwarding the picture or multimedia video pictures according to the requirements of the security strategy rule.

Step S506: according to the requirements of the security strategy rule, the monitoring center (the primary monitoring system) analyzes user behavior by using the received ID, the hash value string and the preconfigured template base. If it is found that the picture or multimedia video pictures are new ones, then according to the requirements of the security strategy rule, the monitoring center (the primary monitoring system) feeds the information back to the preprocessing system which needs to report the picture or multimedia video pictures, the relevant information, the ID, the hash value string and the like information to the monitoring center (the deep monitoring system), and the monitoring center (the deep monitoring system) may need to inform monitoring personnel of the transmission of the new picture or multimedia video pictures in the communication network. And the preprocessing system feeds the information back to the monitoring node, and the monitoring node forbids, delays or allows forwarding the picture or multimedia video pictures according to the requirements of the security strategy rule.

Step S507: if the monitoring center (the primary monitoring system) finds that a modified or new picture or multimedia video pictures are sent in the communication network, then the monitoring center (the primary monitoring system) may need to inform monitoring personnel to recognize the picture or multimedia video pictures, so as to make a conclusion on whether the picture or multimedia video pictures are forwarding-allowed or forwarding-forbidden, and store the conclusion in the template base, and simultaneously inform the monitoring node correspondingly to execute a processing according to the forwarding-allowed or forwarding-forbidden procedure provided above. If the monitoring node adopts a forwarding-delayed measure according to the requirements of the security strategy rule and does not receive further information from the monitoring center (the primary monitoring system and the deep monitoring system) within a given time, then it can execute a processing according to the requirements of the security strategy rule, for example, it forbids or allows forwarding the picture or multimedia video pictures. Moreover, for the two-level monitoring system, the template base stored in the deep monitoring system can be updated into the primary monitoring system according to the requirements of the security strategy rule.

A picture representation method in a preferred embodiment of the present invention is described in details below.

Figure 6:
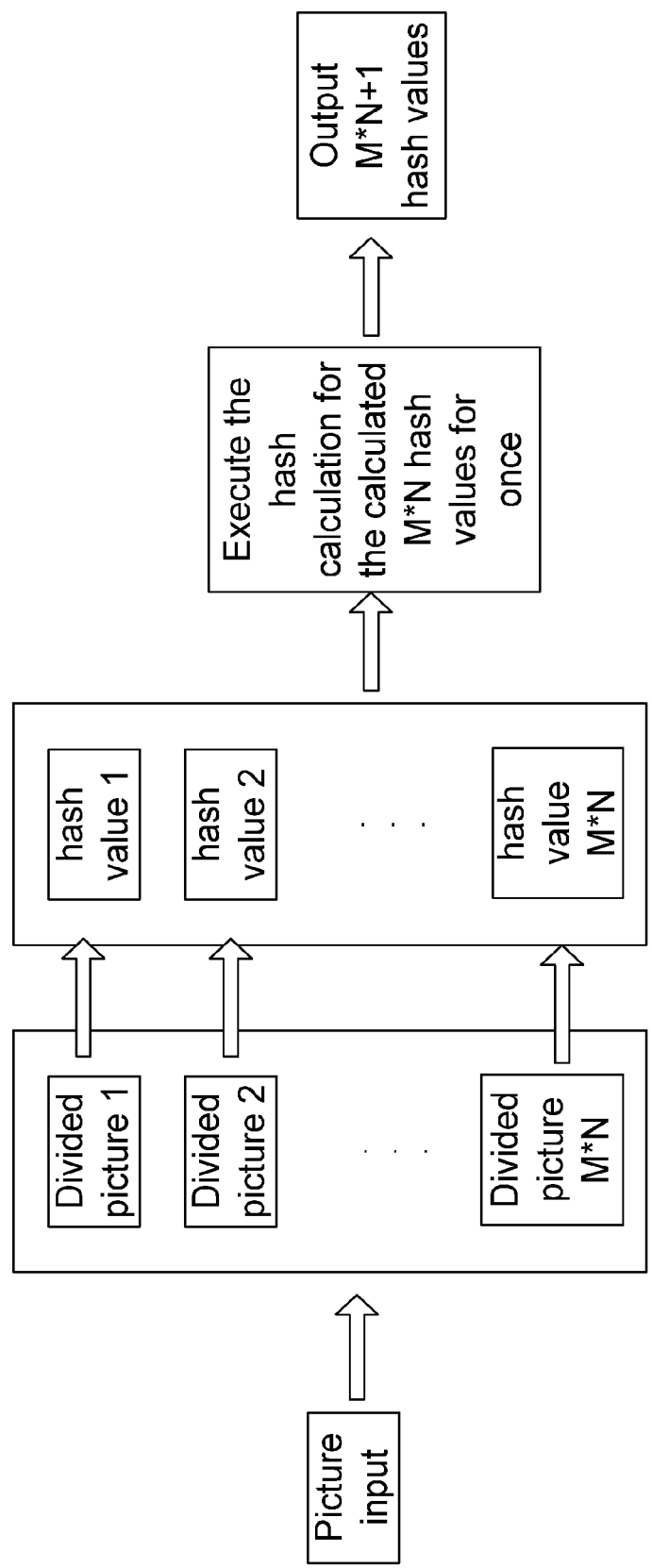
FIG. 6 is a schematic diagram of picture division according to a preferred embodiment of the present invention.

FIG. 6 is a schematic diagram of picture division according to a preferred embodiment of the present invention. As shown in FIG. 6, according to the requirements of the security strategy rule, a received picture is extracted at a monitoring node as an initial picture and then submitted to a preprocessing system. According to the requirements of the security strategy rule, the preprocessing system divides the initial picture into N*M parts, then executes the hash calculation respectively for the N*M parts to obtain a hash value of each part so as to form a group of hash values, and processes the hash value string to form an ID, for example, it executes hash algorithm for once to obtain a single hash value; and for example, it serially connects the group of hash values, and at last, the ID is used to represent the initial picture uniquely.

Specifically, the process that the picture is divided into multiple parts and each part is executed the hash calculation respectively to obtain the hash value of each part specifically includes: the preprocessing system divides the picture into N*M parts, wherein N and M are both positive integers; and the preprocessing system executes the hash calculation respectively for the N*M parts to obtain N*M hash values.

Wherein, the process that multiple hash values are processed to obtain the single ID may include one of the following steps.

(1) The preprocessing system executes the hash calculation for the multiple hash values to obtain a single characteristic hash value as the ID; wherein, the process that the hash calculation is executed for the multiple hash values to obtain a single characteristic hash value specifically includes: the preprocessing system connects the multiple hash values into a single character string; and the preprocessing system executes the hash calculation for the character string to obtain a single character string of less bits as the characteristic hash value.

(2) The preprocessing system connects the multiple hash values into a single character string as the ID.

Moreover, the monitoring method may further include the following steps.

(1) The picture is executed format processing and/or size processing to obtain a processed picture; and the processed picture is divided into multiple parts and each part is executed the hash calculation respectively, and the multiple hash values are processed to obtain the single ID.

For example, before dividing the picture, the preprocessing system may execute conventional preprocessing for the initial picture according to the requirements of the security strategy rule; for example, it converts the initial picture into a picture with standard format or size by using a given method.

(2) The picture is executed color processing to obtain a color-processed picture; and the color-processed picture is divided into multiple parts and each part is executed the hash calculation respectively, and the multiple hash values are processed to obtain the single ID.

For example, before dividing the picture, the preprocessing system may execute color representation processing for the initial picture according to the requirements of the security strategy rule; for example, it converts the color-represented picture into a grey level represented picture.

(3) The picture is executed characteristic value extraction for I times to obtain I extracted sub-pictures and 1 sub-picture as the part of the picture left after the extraction; and then, the I+1 sub-pictures are divided into multiple parts and each part is executed the hash calculation respectively, and the multiple hash values are processed to obtain the single ID.

For example, before executing the hash calculation, according to the requirements of the security strategy rule, the preprocessing system executes characteristic value extraction for the initial picture for I times to form I+1 pictures to be matched by using a conventional characteristic extraction method; then each picture is divided into N*M parts, the hash value of each part is calculated, and the hash value string consisting of (I+1)*N*M hash values is processed to obtain the ID for representing the whole picture.

Figure 7:
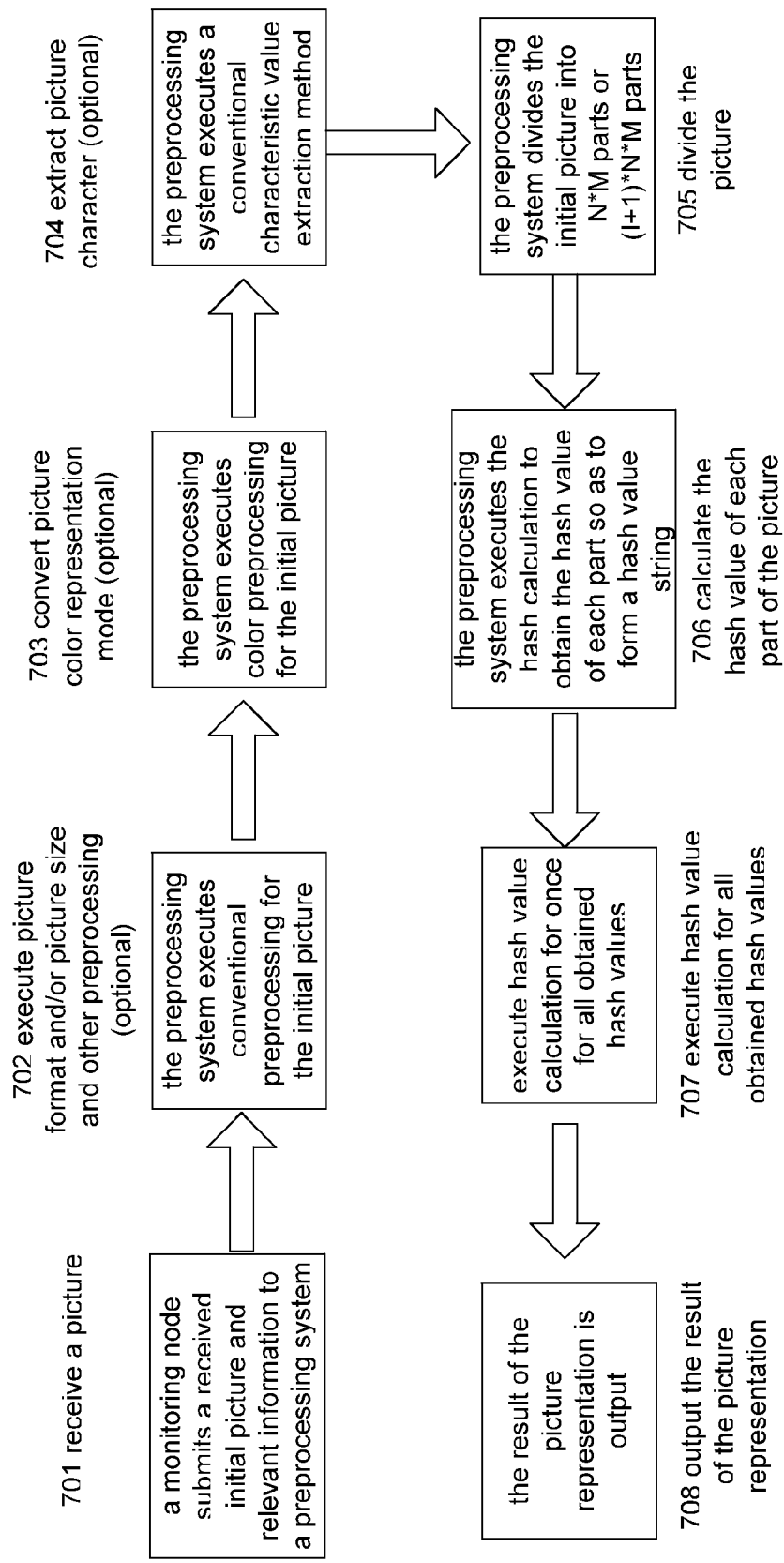
FIG. 7 is a schematic diagram of a picture representation method according to a preferred embodiment of the present invention.

FIG. 7 is a schematic diagram of a picture representation method according to a preferred embodiment of the present invention. As shown in FIG. 7, the picture representation method includes the following steps S701-S708.

Step S701: according to the requirements of the security strategy rule, a monitoring node submits a received initial picture and relevant information thereof to a preprocessing system. The relevant information may include a sender ID (e.g. a name, a cell phone number and an IP address), a receiver ID (e.g. a name, a cell phone number and an IP address), a service ID (e.g. an IP packet ID, a multimedia message ID), information block size (e.g. a byte number), information sending time, picture format, picture size and the like.

Step S702: according to the requirements of the security strategy rule, the preprocessing system executes conventional preprocessing for the initial picture, for example, it converts the initial picture into a picture with standard format and/or size by using a given method.

Step S703: according to the requirements of the security strategy rule, the preprocessing system executes color processing for the picture; for example, it converts the colored picture into a grey level represented picture.

Step S704: according to the requirements of the security strategy rule, the preprocessing system executes characteristic value extraction for the picture for I times by using a conventional characteristic value extraction method, the characteristic value obtained from each extraction can be taken as 1 sub-picture, and thus I+1 sub-pictures are obtained.

Step S705: according to the requirements of the security strategy rule, the preprocessing system divides picture data into N*M parts, or divides each data of the I+1 sub-pictures resulting from the characteristic value extraction into N*M parts respectively.

Step S706: according to the requirements of the security strategy rule, the preprocessing system executes the hash calculation respectively for the N*M or (I+1)*N*M divided parts of the picture by using a given hash algorithm or a negotiated hash algorithm to obtain the hash value of each part, so as to form a hash value string for representing the whole picture.

Step S707: according to the requirements of the security strategy rule, the preprocessing system executes ID calculation for once for the calculated N*M or (I+1)*N*M hash values of the divided parts of the picture by using a given hash algorithm or a negotiated hash algorithm to obtain a single ID for representing the whole picture.

Step S708: the result of the picture representation is output. The initial picture can be represented by the ID obtained in step S707, or by the hash value string obtained in step S706.

It can be seen from the above description that the multiple hash values are processed into the single ID for representation the picture according to the representation method in the present invention, so as to solve the problem of low efficiency of monitoring a picture in the prior art and improve picture monitoring efficiency in communications.

The multimedia video picture representation method in a preferred embodiment of the present invention is described in details below.

Figure 8:
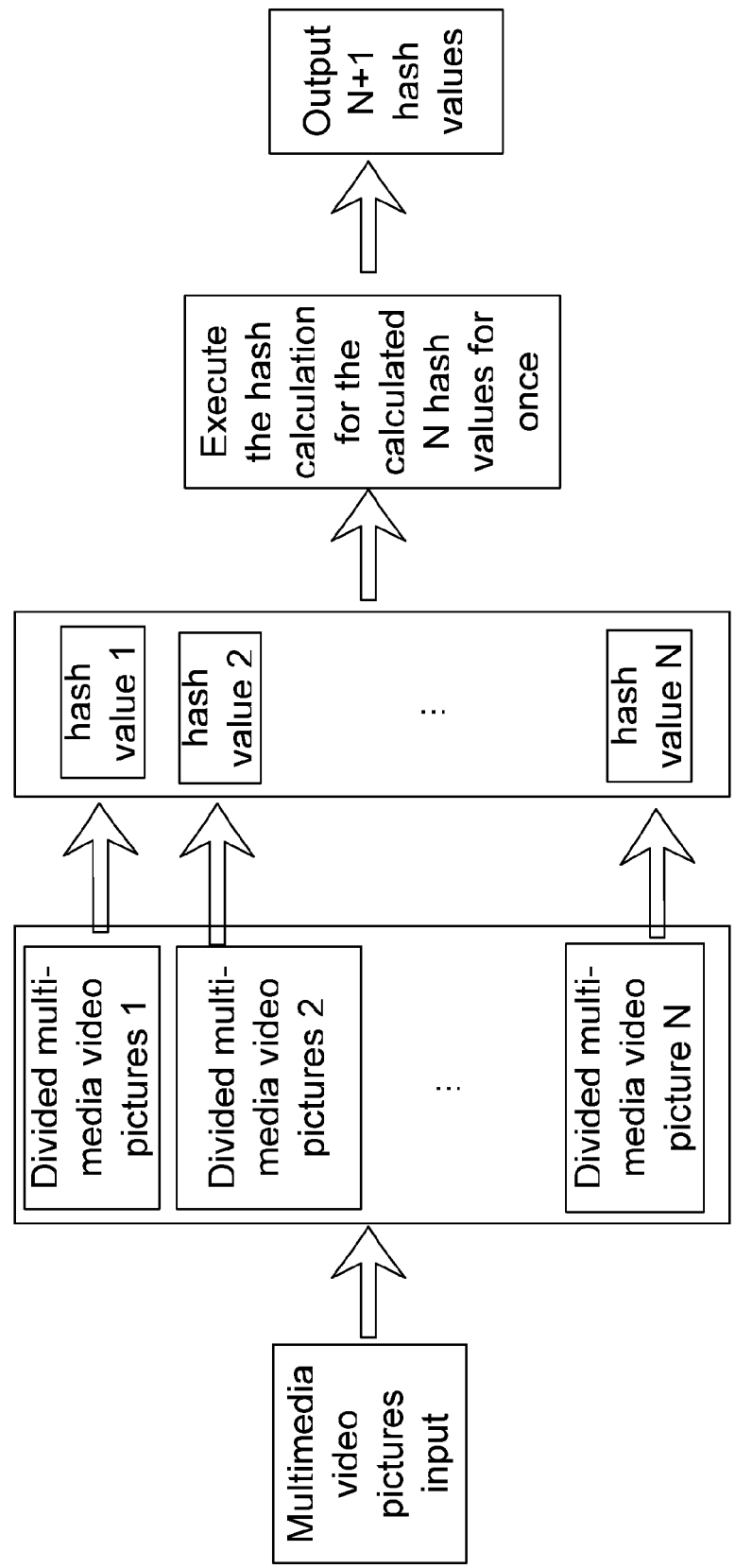
FIG. 8 is a schematic diagram of multimedia video picture division according to a preferred embodiment of the present invention.

FIG. 8 is a schematic diagram of multimedia video picture division according to a preferred embodiment of the present invention. As shown in FIG. 8, according to the requirements of the security strategy rule, received multimedia video pictures are extracted at a monitoring node as initial multimedia video pictures and are then submitted to a preprocessing system. According to the requirements of the security strategy rule, the preprocessing system divides, the initial multimedia video pictures into N parts, then executes the hash calculation respectively for the N parts to obtain a hash value of each part so as to form a group of hash values, and processes the hash value string to form a single ID; for example, it executes a hash algorithm for once for the group of hash values to obtain a single hash value as the ID; or it serially connects the group of hash values and take the serially connected hash values as the ID; and at last, the ID is used to represent the initial multimedia video pictures uniquely.

This preferred embodiment can represent the whole multimedia video pictures by using the single ID without executing the hash calculation for the whole multimedia video pictures. Therefore, recognition times can be decreased, and the number of the bytes of the character string can be obviously reduced to lower the workload of recognition, so that the performance of the system is greatly improved.

Specifically, the process that the multimedia video pictures are divided into multiple parts and each part is executed the hash calculation respectively to obtain the hash value of each part specifically includes: the preprocessing system divides the multimedia video pictures into N parts, wherein N is a positive integer; all picture data of each part of the N parts are serially connected in a given manner respectively to form N data parts; and the preprocessing system executes the hash calculation respectively for the N parts to obtain N hash values.

Wherein, the process that the multiple hash values are processed to obtain the single ID may include one of the following steps.

(1) The preprocessing system executes the hash calculation for the multiple hash values to obtain the single characteristic hash value as the ID; wherein the process that the multiple hash values are executed the hash calculation to obtain the single characteristic hash value specifically includes: the preprocessing system connects the multiple hash values into a single character string; and the preprocessing system executes the hash calculation for the character string to obtain a single character string of less bits as the characteristic hash value.

(2) The preprocessing system connects the multiple hash values into a single character string as the ID.

Moreover, the monitoring method may further include one of the following steps.

(1) The multimedia video pictures are executed format processing and/or size processing to obtain processed multimedia video pictures; and the processed multimedia video pictures are divided into multiple parts and each part is executed the hash calculation respectively, and the multiple hash values are processed to obtain the single ID.

For example, before dividing the multimedia video pictures, the preprocessing system may execute conventional preprocessing for the initial multimedia video pictures according to the requirements of the security strategy rule; for example, it converts the initial multimedia video pictures into multimedia video pictures with standard format or size by using a given method.

(2) The multimedia video pictures are executed color processing to obtain color-processed multimedia video pictures, and the color-processed multimedia video pictures are divided into multiple parts and each part is executed the hash calculation respectively, and the multiple hash values are processed to obtain the single ID.

For example, before dividing the multimedia video pictures, the preprocessing system may execute color representation processing for the initial multimedia video pictures according to the requirements of the security strategy rule; for example, it converts the color-represented multimedia video pictures into grey level represented multimedia video pictures.

(3) The multimedia video pictures are executed characteristic value extraction for I times to obtain I extracted multimedia video sub-pictures and 1 multimedia video sub-picture as the part of the initial picture left after the extraction; and then, the I+1 multimedia video sub-pictures are divided into multiple parts and each part is executed the hash calculation respectively, and the multiple hash values are processed to obtain the single ID.

(4) The known forwarding-forbidden picture or multimedia video pictures are divided into multiple parts in advance and each part is executed the hash calculation respectively to obtain the hash value of each part; the multiple hash values are processed to obtain the ID; and the ID and the multiple hash values are added into the template base.

(5) The known forwarding-allowed or forwarding-forbidden picture or multimedia video pictures are divided into multiple parts and executed the hash calculation respectively to obtain the hash value of each part; the multiple hash values are processed to obtain the ID; and the ID and the multiple hash values are added into the item in the template base, and the attribute of the ID is set to be forwarding-allowed or forwarding-forbidden correspondingly.

Figure 9:
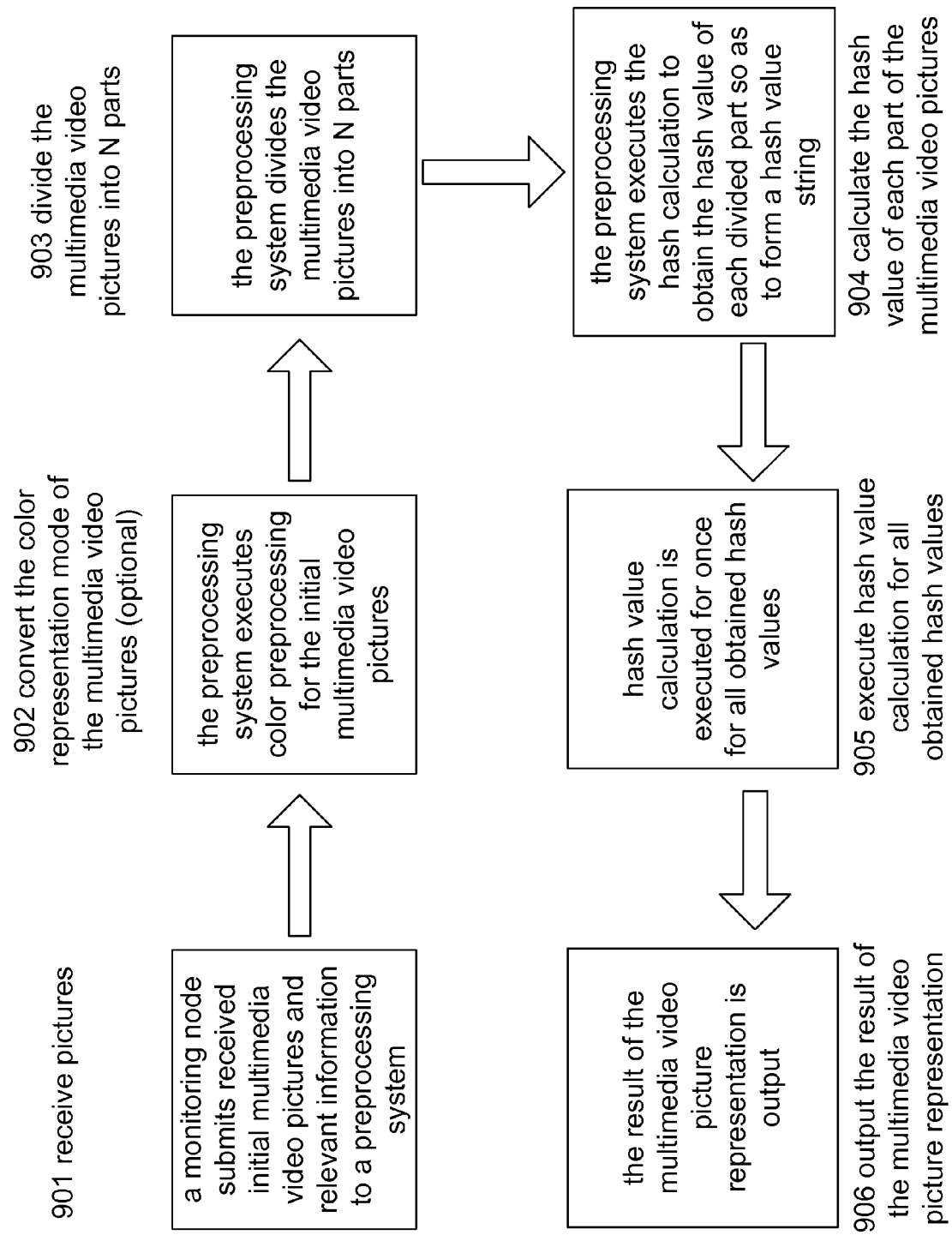
FIG. 9 is a schematic diagram of a multimedia video picture representation method according to a preferred embodiment of the present invention.

FIG. 9 is a schematic diagram of a multimedia video picture representation method according to a preferred embodiment of the present invention. As shown in FIG. 9, the multimedia video picture representation method includes the following steps S901-S906.

Step S901: according to the requirements of the security strategy rule, a monitoring node submits received initial multimedia video pictures and relevant information thereof to a preprocessing system. The relevant information may include a sender ID (e.g. a name, a cell phone number and an IP address), a receiver ID (e.g. a name, a cell phone number and an IP address), a service ID (e.g. an IP packet ID, a multimedia message ID), information block size (e.g. a byte number), information sending time, multimedia video picture format, multimedia video picture size and the like.

Step S902: according to the requirements of the security strategy rule, the preprocessing system executes color processing for the multimedia video pictures; for example, it converts the colored multimedia video pictures into grey level represented multimedia video pictures.

Step S903: the preprocessing system divides the multimedia video picture data into N parts, and each part includes one or more pictures of the multimedia video pictures.

Step S904: according to the requirements of the security strategy rule, the preprocessing system executes the hash calculation respectively for the N parts of the multimedia video pictures by using a given hash algorithm or a negotiated hash algorithm to obtain the hash value of each part, so as to form a hash value string for representing each divided part of the multimedia video pictures.

Step S905: according to the requirements of the security strategy rule, the preprocessing system executes ID calculation for once for the N hash values which are calculated for the divided parts of the multimedia video pictures by using a given hash algorithm or a negotiated hash algorithm to obtain a single ID for representing the whole multimedia video pictures.

Step 906: the result of the multimedia video picture representation is output. The initial multimedia video pictures can be represented by the hash values obtained in step S904, or by the ID obtained in step S905.

It can be seen from the above description that the monitoring method of the present invention can quickly recognize the initial picture and the initial multimedia video pictures and recognize the picture which is scaled up or scaled down, changed in color representation mode or modified, as well as recognize the multimedia video pictures which are changed in color representation mode or modified; therefore, the monitoring method can be applied in a monitoring system conveniently.

The monitoring method processes multiple hash values into a single ID and only monitors the single ID at first, thus it can solve the problem of low efficiency of monitoring a picture or multimedia video pictures in the prior art and consequentially improve efficiency of monitoring a picture or multimedia video pictures in communications.

Obviously, it should be understood by those technicians skilled in the art that the modules or steps of the present invention can be realized by universal computing devices, centralized on a single computing device or distributed on a network consisting of multiple computing devices; optionally, the modules or steps can be carried out by computing device-executable program codes, and stored in a storage device to be executed by computing devices; or the modules or steps can be manufactured into integrated circuit modules respectively, or the multiple modules or steps are manufactured into a single integrated circuit module. So the present invention is not limited to the combination of any special hardware and software.

The above descriptions are only preferred embodiments of the present invention, rather than limit the present invention, as to those technicians skilled in the art, various modification and changes can be made to the present invention. Any modification, equivalent substitute and improvement within spirit and principle of the present invention are in the protection scope of the present invention.

What is claimed is:

1. A method for monitoring a picture or multimedia video pictures in a communication system, including:
    a monitoring node extracting a picture or multimedia video pictures from communication data;
    a preprocessing system dividing the picture or multimedia video pictures into multiple parts, and executing hash calculation of each part respectively to obtain a hash value of each part;
    the preprocessing system processing the multiple hash values to construct an single ID;
    a primary monitoring system searching a template base for the ID wherein the template base includes multiple items, and each item includes the ID and hash values of which the ID in the item is composed;
    the primary monitoring system searching the template base for each hash value respectively if the ID is not found; and
    the primary monitoring system informing the search result to the preprocessing system and the monitoring node,
    wherein the items of the template base is prestored with the ID of forwarding-forbidden picture or multimedia video pictures and the hash values of which the ID in the items are composed; the monitoring method further includes:
    if the search result is that the ID is found, then the primary monitoring system or the preprocessing system forwards relevant information of the picture or multimedia video pictures to a deep monitoring system;
    the monitoring node cancels the forwarding of the picture or multimedia video pictures; and
    the preprocessing system forwards the picture or multimedia video pictures to the deep monitoring system.

2. The monitoring method according to claim 1, wherein the process that the primary monitoring system informs the search result to the preprocessing system and the monitoring node specifically includes:
    the primary monitoring system informs the search result to the preprocessing system, which then informs the search result to the monitoring node; or
    the primary monitoring system simultaneously informs the search result to the preprocessing system and the monitoring node.

3. The monitoring method according to claim 1, the monitoring method further includes:
    if the search result is that the hash value, instead of the ID, is found, then the primary monitoring system or the preprocessing system forwards the relevant information of the picture or multimedia video pictures to the deep monitoring system;
    the primary monitoring system adds the ID into the template base;
    the preprocessing system forwards the picture or multimedia video pictures to the deep monitoring system; and
    the monitoring node cancels the forwarding of the picture or multimedia video pictures.

4. The monitoring method according to claim 3, the monitoring method further includes:
    if the search result is that neither the ID nor the hash value is found, then the monitoring node forwards the picture or multimedia video pictures.

5. The monitoring method according to claim 1, wherein each item further includes attribute of the ID, and the process that the primary monitoring system searches the template base for the ID specifically includes:

if the ID is found, the attribute of the ID is read.

6. A method for monitoring a picture or multimedia video pictures in a communication system, including:

a monitoring node extracting a picture or multimedia video pictures from communication data;

a preprocessing system dividing the picture or multimedia video pictures into multiple parts, and executing hash calculation of each part respectively to obtain a hash value of each part;

the preprocessing system processing the multiple hash values to construct an single ID;

a primary monitoring system searching a template base for the ID wherein the template base includes multiple items, and each item includes the ID and hash values of which the ID in the item is composed;

the primary monitoring system searching the template base for each hash value respectively if the ID is not found; and the primary monitoring system informing the search result to the preprocessing system and the monitoring node, wherein each item further includes attribute of the ID, and the process that the primary monitoring system searches the template base for the ID specifically includes: if the ID is found, the attribute of the ID is read;

wherein, the monitoring method further includes:

if the search result is that the ID is found and the attribute of the ID is forwarding-forbidden, then the primary monitoring system or the preprocessing system forwards the relevant information of the picture or multimedia video pictures to a deep monitoring system;

the monitoring node cancels the forwarding of the picture or multimedia video pictures; and the preprocessing system forwards the picture or multimedia video pictures to the deep monitoring system.

7. The monitoring method according to claim 5, the monitoring method further includes:

if the search result is that the ID is found and the attribute of the ID is forwarding-allowed, then the monitoring node forwards the picture or multimedia video pictures.

8. A method for monitoring a picture or multimedia video pictures in a communication system, including:

a monitoring node extracting a picture or multimedia video pictures from communication data;

a preprocessing system dividing the picture or multimedia video pictures into multiple parts, and executing hash calculation of each part respectively to obtain a hash value of each part;

the preprocessing system processing the multiple hash values to construct an single ID;

a primary monitoring system searching a template base for the ID wherein the template base includes multiple items, and each item includes the ID and hash values of which the ID in the item is composed;

the primary monitoring system searching the template base for each hash value respectively if the ID is not found; and the primary monitoring system informing the search result to the preprocessing system and the monitoring node, wherein each item further includes attribute of the ID, and the process that the primary monitoring system searches the template base for the ID specifically includes: if the ID is found, the attribute of the ID is read;

wherein if the ID is not found, then the process that the primary monitoring system searches the template base for each hash value respectively specifically includes:

the primary monitoring system searches for each hash value according to the hash value of the ID whose attribute is forwarding-forbidden in the template base.

9. The monitoring method according to claim 8, the monitoring method further includes:

if the search result is that the hash value, instead of the ID, is found, then the primary monitoring system or the preprocessing system forwards the relevant information of the picture or multimedia video pictures to a deep monitoring system;

the primary monitoring system adds the ID into the template base;

the preprocessing system forwards the picture or multimedia video pictures to the deep monitoring system; and the monitoring node cancels the forwarding of the picture or multimedia video pictures.

10. The monitoring method according to claim 8, the monitoring method further includes:

if the search result is that neither the ID nor the hash value is found, then the primary monitoring system or the preprocessing system forwards the relevant information of the picture or multimedia video pictures to the deep monitoring system;

the preprocessing system forwards the picture or multimedia video pictures to the deep monitoring system; and the primary monitoring system receives a notification from the deep monitoring system and accordingly informs the monitoring node.

11. The monitoring method according to claim 10, wherein the process that the notification indicates the picture or multimedia video pictures to be forwarding-forbidden further includes:

the primary monitoring system adds the ID into the template base, sets the attribute of the ID to be forwarding-forbidden, adds the multiple hash values into the item corresponding to the ID, and informs a forwarding-forbidden indication to the monitoring node; and the monitoring node cancels the forwarding of the picture or multimedia video pictures.

12. The monitoring method according to claim 10, wherein the process that the notification indicates the picture or multimedia video pictures to be forwarding-allowed further includes:

the primary monitoring system adds the ID and the multiple hash values into the template base and sets the attribute of the ID to be forwarding-allowed;

the primary monitoring system informs a forwarding-allowed indication to the monitoring node; and the monitoring node forwards the picture or multimedia video pictures.

13. The monitoring method according to claim 10, the monitoring method further includes:

if the monitoring node does not receive the notification within a given time, then the monitoring node forwards the picture or multimedia video pictures, or cancels the forwarding of the picture or multimedia video pictures.

14. The monitoring method according to claim 8, the monitoring method further includes:

if the search result is that neither the ID nor the hash value is found, then the monitoring node forwards the picture or multimedia video pictures.

15. The monitoring method according to claim 1, wherein the relevant information includes at least one of:
   a sender ID, a receiver ID, a service ID, information block size, information sending time, picture format and picture size of the picture or multimedia video pictures.

16. The monitoring method according to claim 1, wherein the process that the picture is divided into multiple parts and each part is executed the hash calculation respectively to obtain the hash value of each part specifically includes:
   the preprocessing system divides the picture into N*M parts, wherein N and M are both positive integers; and
   the preprocessing system executes the hash calculation respectively for the N*M parts to obtain N*M hash values.

17. The monitoring method according to claim 1,
   wherein the process that the multiple hash values are processed to construct the single ID specifically includes:
   the preprocessing system executes the hash calculation for the multiple hash values to obtain a single characteristic hash value as the ID.

18. A method for monitoring a picture or multimedia video pictures in a communication system, including:
   a monitoring node extracting a picture or multimedia video pictures from communication data;
   a preprocessing system dividing the picture or multimedia video pictures into multiple parts, and executing hash calculation of each part respectively to obtain a hash value of each part;
   the preprocessing system processing the multiple hash values to construct an single ID;
   a primary monitoring system searching a template base for the ID wherein the template base includes multiple items, and each item includes the ID and hash values of which the ID in the item is composed;
   the primary monitoring system searching the template base for each hash value respectively if the ID is not found; and
   the primary monitoring system informing the search result to the preprocessing system and the monitoring node,
   wherein the process that the multiple hash values are processed to construct the single ID specifically includes:
   the preprocessing system executes the hash calculation for the multiple hash values to obtain a single characteristic hash value as the ID,
   wherein the process that the multiple hash values are executed the hash calculation to obtain the single characteristic hash value specifically includes:
   the preprocessing system connects the multiple hash values into a single character string; and
   the preprocessing system executes the hash calculation for the character string to obtain a single character string of less bits as the characteristic hash value.

19. The monitoring method according to claim 1, wherein the process that the multiple hash values are processed to construct the single ID specifically includes:
   the preprocessing system connects the multiple hash values into a single character string as the ID.

20. The monitoring method according to claim 16, the monitoring method further includes:
   the picture is executed format processing and/or size processing to obtain a processed picture; and
   the processed picture is divided into multiple parts and each part is executed the hash calculation respectively, and the multiple hash values are processed to construct the single ID.

21. The monitoring method according to claim 16, the monitoring method further includes:
   the picture is executed color processing to obtain a color-processed picture; and
   the color-processed picture is divided into multiple parts and each part is executed the hash calculation respectively, and the multiple hash values are processed to construct the single ID.

22. A method for monitoring a picture or multimedia video pictures in a communication system, including:
   a monitoring node extracting a picture or multimedia video pictures from communication data;
   a preprocessing system dividing the picture or multimedia video pictures into multiple parts, and executing hash calculation of each part respectively to obtain a hash value of each part;
   the preprocessing system processing the multiple hash values to construct an single ID;
   a primary monitoring system searching a template base for the ID wherein the template base includes multiple items, and each item includes the ID and hash values of which the ID in the item is composed;
   the primary monitoring system searching the template base for each hash value respectively if the ID is not found; and
   the primary monitoring system informing the search result to the preprocessing system and the monitoring node,
   wherein the process that the picture is divided into multiple parts and each part is executed the hash calculation respectively to obtain the hash value of each part specifically includes:
   the preprocessing system divides the picture into N*M parts, wherein N and M are both positive integers; and
   the preprocessing system executes the hash calculation respectively for the N*M parts to obtain N*M hash values,
   wherein the monitoring method further includes:
   the picture is executed characteristic value extraction for 1 times to obtain I extracted sub-pictures and 1 sub-picture as a part of the picture left after the extraction;
   and then, the I+1 sub-pictures are divided into multiple parts and each part is executed the hash calculation respectively, and the multiple hash values are processed to construct the single ID.

23. The monitoring method according to claim 1, the process that the multimedia video pictures are divided into multiple parts and each part is executed the hash calculation respectively to obtain the hash value of each part specifically includes:
   the preprocessing system divides the multimedia video pictures into N parts, wherein N is a positive integer;
   all picture data of each part of the N parts are serially connected in a given manner respectively to form N data parts; and
   the preprocessing system executes the hash calculation respectively for the N parts to obtain N hash values.

24. The monitoring method according to claim 1, wherein the process that the multiple hash values are processed to construct the single ID specifically includes:
   the preprocessing system executes the hash calculation for the multiple hash values to obtain a single characteristic hash value as the ID.

25. A method for monitoring a picture or multimedia video pictures in a communication system, including:
- a monitoring node extracting a picture or multimedia video pictures from communication data;
- a preprocessing system dividing the picture or multimedia video pictures into multiple parts, and executing hash calculation of each part respectively to obtain a hash value of each part;
- the preprocessing system processing the multiple hash values to construct an single ID;
- a primary monitoring system searching a template base for the ID wherein the template base includes multiple items, and each item includes the ID and hash values of which the ID in the item is composed;
- the primary monitoring system searching the template base for each hash value respectively if the ID is not found; and
- the primary monitoring system informing the search result to the preprocessing system and the monitoring node,
- wherein the process that the multiple hash values are processed to construct the single ID specifically includes:
- the preprocessing system executes the hash calculation for the multiple hash values to obtain a single characteristic hash value as the ID,
- wherein the process that the multiple hash values are executed the hash calculation to obtain the single characteristic hash value specifically includes:
- the preprocessing system connects the multiple hash values into a single character string; and
- the preprocessing system executes the hash calculation for the character string to obtain a single character string of less bits as the characteristic hash value.

26. The monitoring method according to claim 1, wherein the process that the multiple hash values are processed to construct the single ID specifically includes:
- the preprocessing system connects the multiple hash values into a single character string as the ID.

27. The monitoring method according to claim 23, the monitoring method further includes:
- the multimedia video pictures are executed format processing and/or size processing to obtain processed multimedia video pictures; and
- the processed multimedia video pictures are divided into multiple parts and each part is executed the hash calculation respectively, and the multiple hash values are processed to construct the single ID.

28. The monitoring method according to claim 23, the monitoring method further includes:
- the multimedia video pictures are executed color processing to obtain color-processed multimedia video pictures; and
- the color-processed multimedia video pictures are divided into multiple parts and each part is executed the hash calculation respectively, and the multiple hash values are processed to construct the single ID.

29. A method for monitoring a picture or multimedia video pictures in a communication system, including:
- a monitoring node extracting a picture or multimedia video pictures from communication data;
- a preprocessing system dividing the picture or multimedia video pictures into multiple parts, and executing hash calculation of each part respectively to obtain a hash value of each part;
- the preprocessing system processing the multiple hash values to construct an single ID;
- a primary monitoring system searching a template base for the ID wherein the template base includes multiple items, and each item includes the ID and hash values of which the ID in the item is composed;
- the primary monitoring system searching the template base for each hash value respectively if the ID is not found; and
- the primary monitoring system informing the search result to the preprocessing system and the monitoring node,
- wherein the process that the multimedia video pictures are divided into multiple parts and each part is executed the hash calculation respectively to obtain the hash value of each part specifically includes:
- the preprocessing system divides the multimedia video pictures into N parts, wherein N is a positive integer;
- all picture data of each part of the N parts are serially connected in a given manner respectively to form N data parts; and
- the preprocessing system executes the hash calculation respectively for the N parts to obtain N hash values
- wherein the monitoring method further includes:
- the multimedia video pictures are executed characteristic value extraction for 1 times to obtain I multimedia video sub-pictures and 1 sub-picture as the part of the initial pictures left after the extraction;
- and then, the I+1 multimedia video sub-pictures are divided into multiple parts and each part is executed the hash calculation respectively, and the multiple hash values are processed to construct the initial ID.

30. The monitoring method according to claim 1, the monitoring method further includes:
- a known forwarding-forbidden picture or multimedia video pictures are divided into multiple parts in advance and each part is executed the hash calculation respectively to obtain the hash value of each part;
- the multiple hash values are processed to obtain the ID; and
- the ID and the multiple hash values are added into the template base.

31. The monitoring method according to claim 5, the monitoring method further includes:
- a known forwarding-allowed or forwarding-forbidden picture or multimedia video pictures are divided into multiple parts and each part is executed the hash calculation respectively to obtain the hash value of each part;
- the multiple hash values are processed to obtain the ID; and
- the ID and the multiple hash values are added into the item in the template base, and the attribute of the ID is set to be forwarding-allowed or forwarding-forbidden correspondingly.

32. The monitoring method according to claim 17, the monitoring method further includes:
- the picture is executed format processing and/or size processing to obtain a processed picture; and
- the processed picture is divided into multiple parts and each part is executed the hash calculation respectively, and the multiple hash values are processed to construct the single ID.

33. The monitoring method according to claim 18, the monitoring method further includes:
- the picture is executed format processing and/or size processing to obtain a processed picture; and
- the processed picture is divided into multiple parts and each part is executed the hash calculation respectively, and the multiple hash values are processed to construct the single ID.

34. The monitoring method according to claim 19, the monitoring method further includes:
- the picture is executed format processing and/or size processing to obtain a processed picture; and the processed picture is divided into multiple parts and each part is executed the hash calculation respectively, and the multiple hash values are processed to construct the single ID.

35. The monitoring method according to claim 17, the monitoring method further includes:
the picture is executed color processing to obtain a color-processed picture; and
the color-processed picture is divided into multiple parts and each part is executed the hash calculation respectively, and the multiple hash values are processed to construct the single ID.

36. The monitoring method according to claim 18, the monitoring method further includes:
the picture is executed color processing to obtain a color-processed picture; and
the color-processed picture is divided into multiple parts and each part is executed the hash calculation respectively, and the multiple hash values are processed to construct the single ID.

37. The monitoring method according to claim 19, the monitoring method further includes:
the picture is executed color processing to obtain a color-processed picture; and
the color-processed picture is divided into multiple parts and each part is executed the hash calculation respectively, and the multiple hash values are processed to construct the single ID.

38. The monitoring method according to claim 17, the monitoring method further includes:
the picture is executed characteristic value extraction for 1 times to obtain I extracted sub-pictures and 1 sub-picture as the part of the picture left after the extraction;
and then, the I+1 sub-pictures are divided into multiple parts and each part is executed the hash calculation respectively, and the multiple hash values are processed to construct the single ID.

39. The monitoring method according to claim 18, the monitoring method further includes:
the picture is executed characteristic value extraction for 1 times to obtain I extracted sub-pictures and 1 sub-picture as the part of the picture left after the extraction;
and then, the I+1 sub-pictures are divided into multiple parts and each part is executed the hash calculation respectively, and the multiple hash values are processed to construct the single ID.

40. The monitoring method according to claim 19, the monitoring method further includes:
the picture is executed characteristic value extraction for 1 times to obtain I extracted sub-pictures and 1 sub-picture as the part of the picture left after the extraction;
and then, the I+1 sub-pictures are divided into multiple parts and each part is executed the hash calculation respectively, and the multiple hash values are processed to construct the single ID.

41. The monitoring method according to claim 24, the monitoring method further includes:
the multimedia video pictures are executed format processing and/or size processing to obtain processed multimedia video pictures; and
the processed multimedia video pictures are divided into multiple parts and each part is executed the hash calculation respectively, and the multiple hash values are processed to construct the single ID.

42. The monitoring method according to claim 25, the monitoring method further includes:
the multimedia video pictures are executed format processing and/or size processing to obtain processed multimedia video pictures; and
the processed multimedia video pictures are divided into multiple parts and each part is executed the hash calculation respectively, and the multiple hash values are processed to construct the single ID.

43. The monitoring method according to claim 26, the monitoring method further includes:
the multimedia video pictures are executed format processing and/or size processing to obtain processed multimedia video pictures; and
the processed multimedia video pictures are divided into multiple parts and each part is executed the hash calculation respectively, and the multiple hash values are processed to construct the single ID.

44. The monitoring method according to claim 24, the monitoring method further includes:
the multimedia video pictures are executed color processing to obtain color-processed multimedia video pictures; and
the color-processed multimedia video pictures are divided into multiple parts and each part is executed the hash calculation respectively, and the multiple hash values are processed to construct the single ID.

45. The monitoring method according to claim 25, the monitoring method further includes:
the multimedia video pictures are executed color processing to obtain color-processed multimedia video pictures; and
the color-processed multimedia video pictures are divided into multiple parts and each part is executed the hash calculation respectively, and the multiple hash values are processed to construct the single ID.

46. The monitoring method according to claim 26, the monitoring method further includes:
the multimedia video pictures are executed color processing to obtain color-processed multimedia video pictures; and
the color-processed multimedia video pictures are divided into multiple parts and each part is executed the hash calculation respectively, and the multiple hash values are processed to construct the single ID.

47. The monitoring method according to claim 24, the monitoring method further includes:
the multimedia video pictures are executed characteristic value extraction for 1 times to obtain I multimedia video sub-pictures and 1 sub-picture as the part of the initial pictures left after the extraction;
and then, the I+1 multimedia video sub-pictures are divided into multiple parts and each part is executed the hash calculation respectively, and the multiple hash values are processed to construct the initial ID.

48. The monitoring method according to claim 25, the monitoring method further includes:
the multimedia video pictures are executed characteristic value extraction for 1 times to obtain I multimedia video sub-pictures and 1 sub-picture as the part of the initial pictures left after the extraction;
and then, the I+1 multimedia video sub-pictures are divided into multiple parts and each part is executed the hash calculation respectively, and the multiple hash values are processed to construct the initial ID.

49. The monitoring method according to claim 26, the monitoring method further includes:

the multimedia video pictures are executed characteristic value extraction for I times to obtain I multimedia video sub-pictures and 1 sub-picture as the part of the initial pictures left after the extraction;

and then, the I+1 multimedia video sub-pictures are divided into multiple parts and each part is executed the hash calculation respectively, and the multiple hash values are processed to construct the initial ID.

* * * * *